United States Patent [19]

Szentes

[11] 4,369,651
[45] Jan. 25, 1983

[54] NON-CONTACTING MULTI-FUNCTION SENSOR ARRANGEMENT

[75] Inventor: John F. Szentes, Peoria, Ill.

[73] Assignee: Caterpillar Tractor Co., Peoria, Ill.

[21] Appl. No.: 278,498

[22] PCT Filed: Mar. 3, 1981

[86] PCT No.: PCT/US81/00267
§ 371 Date: Mar. 3, 1981
§ 102(e) Date: Mar. 3, 1981

[87] PCT Pub. No.: WO82/03124
PCT Pub. Date: Sep. 16, 1982

[51] Int. Cl.³ ........................................ G01M 15/00
[52] U.S. Cl. ................................. 73/119 A; 33/1 N
[58] Field of Search ............... 73/116, 117.3, 119 A; 123/414; 324/160, 173, 174, 179, 392; 33/1 N, 1 PT; 318/85

[56] References Cited

U.S. PATENT DOCUMENTS 3,184,668  5/1965  Whitecar .......................... 318/85 X
4,179,922 12/1979  Bouverie et al. ..................... 73/116
4,188,820  2/1980  Moser et al. ......................... 73/116
4,262,526  4/1981  Makita et al. .................... 123/416 X Primary Examiner—Jerry W. Myracle
Attorney, Agent, or Firm—Richard F. Phillips

[57] ABSTRACT

Apparatus for measuring the amount of phase shift between first and second rotating shafts (16,19) and/or the amount of limited movement of a third shaft (41) from a reference position. First and second magnetically sensible members (47,53) move through circular paths at speeds proportional to the speeds of the first and second shafts (11,12), respectively, and first and second signals (71,72) are generated by first and second magnetic sensors fixed adjacent the respective paths of the sensible members. A third signal (73) is generated by a third magnetic sensor (62), which is movable along the path of the second sensible member (53) in response to movement of the third shaft (41). Clock pulses from clock (76) are counted between successive second and first signals (72,71) and are counted between successive second and third signals (72,73) to provide digital information proportional to the phase shift between the first and second shafts (16,19) and movement of the third shaft (41). The present invention is particularly useful in engine control systems to measure timing angle advance and fuel rack movement.

21 Claims, 4 Drawing Figures

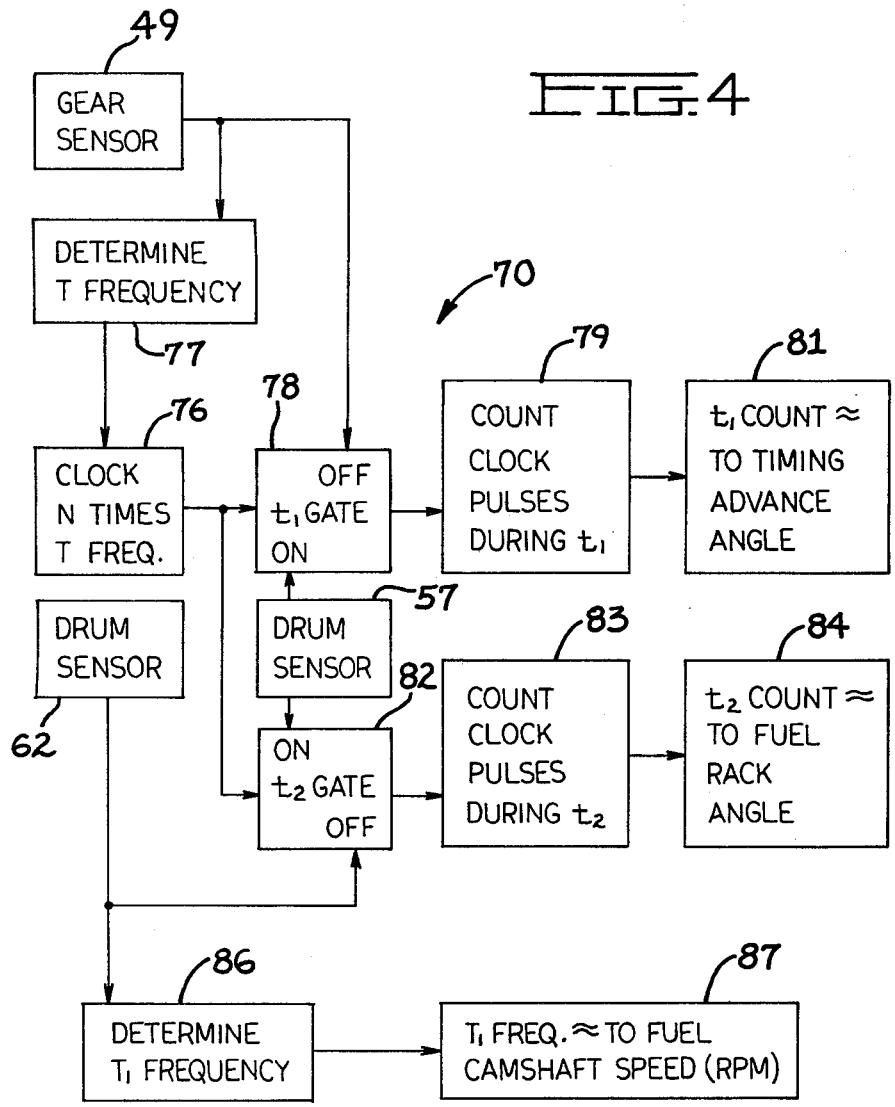

NON-CONTACTING MULTI-FUNCTION SENSOR ARRANGEMENT

DESCRIPTION

1. Technical Field

This invention relates generally to the measurement of angular rotation of shafts, and more particularly to apparatus for determining the amount of rotation of a shaft from a fixed reference point or the amount of rotational phase shift between two constantly rotating shafts.

2. Background Art

Basic control of the operation of an internal combustion engine is accomplished by varying the amount of fuel delivered to the engine cylinders by the fuel pump and by controlling the time that the fuel in the cylinders ignites as the pistons each approach top dead center on the compression stroke. In general, the amount of fuel delivered to the cylinders will control the speed of the engine while the timing of ignition will control the efficiency of fuel combustion.

In a typical four-stroke-cycle diesel engine, a timing shaft will be gear driven by the engine crank shaft at half engine speed, with the timing shaft being coupled to the fuel camshaft of a fuel pump by a timing mechanism so that the fuel pump will deliver fuel individually to half of the engine cylinders during an engine revolution and to the other half of the cylinders in the next engine revoution. A controllable and movable fuel rack will vary the amount of fuel that the fuel pump delivers to the cylinders and the timing mechanism will vary the angular phase relation between the timing shaft and the fuel camshaft so that fuel is injected into the cylinders at the proper time in engine operation relative to the pistons reaching top dead center in their compression strokes.

In order to provide an electronic engine control system which will function to maintain engine performance at maximum efficiency under varying operating conditions, it is necessary to obtain, repeatedly and rapidly, precise information as to the engine speed, magnitude of the timing advance angle, and the position of the fuel rack.

There are a number of problems involved in obtaining the desired information.

First of all, the apparatus should have a life which meets or exceeds engine overhaul time to prevent premature failure and loss of control during engine operation. To meet this requirement, the components utilized for detection of speed and angular displacement should be simple, rugged and non-contacting.

A provision of separate sensing systems for each particular function that is being monitored increases the cost of an overall control system. To overcome this problem, the functions of the sensing systems should be correlated so that the desired information as to the various functions is obtained with the least number of sensor devices.

Sensing systems which provide analog information as to the function being monitored are often inaccurate since age and varying temperature condition will often cause component values to change. To overcome this problem, it is desirable to provide a system in which digital information of the monitored conditions is obtained.

DISCLOSURE OF THE INVENTION

The present invention is directed to overcoming one or more of the problems set forth above.

In one aspect of the invention, and in a system having first and second shafts and timing means for rotatably driving one shaft by the other at a desired and variable angular relationship between the shafts, a sensing system is provided having: first and second sensible members rotatable through circular paths at speeds proportional to the speeds of the first and second shafts, respectively; first and second signal generators which generate first and second signals, respectively, in response to movement of the first and second sensible members past a predetermined point in each path thereof; and, means for counting clock pulses during the period between a first and second signal. The number of clock pulses counted provides digital information as to the angular relationship between the two rotating shafts.

In another aspect of the invention, and in which there is a third shaft movable through a limited distance, the above-mentioned sensing system further includes: a third signal generator for generating a third signal in response to movement of the second sensible member past a determinable point in its path of movement, means for moving the determinable point along such path in response to movement of the third shaft; and, means for counting the number of clock pulses during the time between second and third signals of the second and third signal generators, respectively. This number of clock pulses counted provides digital information as to the amount of movement of the third shaft.

A further aspect of the invention, wherein a shaft is movable through a limited distance, a sensing system is provided having: a sensible member rotatable through a path of movement; a first signal generator for generating a signal in response to movement of the sensible member past a predetermined point in its path of movement; a second signal generator for generating second signal in response to movement of the sensible member past a determinable point in its path of movement, means for moving the determinable point along the path of movement in response to movement of the shaft; and, means for counting clock pulses during the time between the signals of the two signal generators.

Still another aspect of the invention is that the sensible members are magnetically sensible and that the signal generators include magnet sensors.

The foregoing and other aspects will become apparent from the following detailed description of the invention when considered in conjunction with the accompanying drawings.

BRIEF DESCRIPTION OF THE DRAWINGS

FIG. 4 is a block diagram of the data processor of FIG. 1.

BEST MODE FOR CARRYING OUT THE INVENTION

Figure 1:
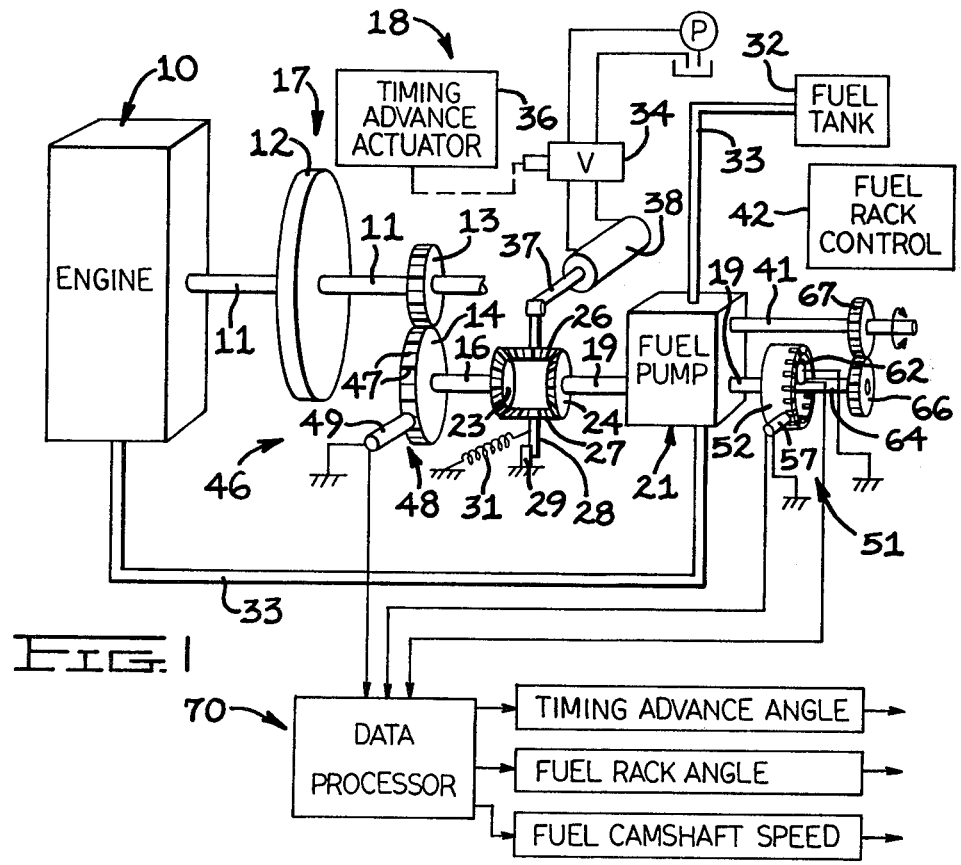
FIG. 1 is a generally schematic illustration of an engine and fuel pump system utilizing the sensor arrangement of the present invention.

Referring now to the drawings, wherein a preferred embodiment of the invention is shown, FIG. 1 illustrates schematically an internal combustion engine 10, such as a four-stroke-cycle diesel engine, the engine having a crank shaft 11 to which is fixed flywheel 12. Meshed gears 13 and 14, on crank shaft 11 and timing shaft 16 respectively, are provided to transmit engine rotation to the timing shaft. Engine 10, crank shaft 11 and gears 13 and 14 thus constitute a drive means 17 for driving timing shaft 16 at a rotational speed directly proportional to the engine speed, the constant of proportionality being dependent on the gear ratio of gears 13 and 14. Typically, the gear ratio is such that the timing shaft 16 is driven at half-engine-speed.

A timing means 18 is provided to rotatively drive fuel camshaft 19 of fuel pump 21 by timing shaft 16 and to vary, within a predetermined range, the angular relationship between the timing shaft 16 and fuel camshaft 19. As illustrated in FIG. 1, timing means 18 may comprise bevel gears 23 and 24 fixed to timing shaft 16 and fuel camshaft 19, respectively, with the drive of gear 23 being transmitted to gear 24 by bevel gears 26 and 27 which are each meshed with gears 23 and 24 and are rotatable on spindle 28. Spindle 28 is biased towards a zero reference fixed stop 29 by spring 31. The timing means is initially bench-set so that when the spindle 28 rests against stop 29, the fuel camshaft 19 will cause the fuel pump 21 to deliver fuel from fuel tank 32 and fuel line 33 to the cylinders of engine 10 at a minimum advance (typically 14°) before top dead center of the engine pistons. Alternatively, a standard differential or other means for varying the angular relationship between the two shafts 16 and 19 may also be used.

The timing means 18 will cause the timing advance angle of fuel delivery to be set at a desired value greater than minimum during operation of the engine, as by actuation of hydraulic valve 34 in response to timing advance actuator 36, so that piston 37 of hydraulic cylinder 38 will extend or retract and cause gear spindle 28 to move to a desired position relative to stop 29. At such desired position gears 26 and 27 will cause fuel camshaft 19 to be driven at the same speed as that of timing shaft 16, but the angular relationship of the two shafts 16 and 19 will have increased from the minimum advance relationship.

Fuel pump 21 has a movable fuel rack shaft 41, controlled by fuel rack actuator 42, to control the amount of fuel flow through the fuel pump. In a scroll type fuel pump, shaft 41 is rotatable through a limited distance between minimum and maximum reference points, with the amount of fuel delivered by the fuel pump being determined by the position to which shaft 41 is moved.

A first rotation responsive means 46 is provided for generating a signal each time that the engine 10 has rotated through a particular angle. In this case, the gear 14, of ferromagnetic material, constitutes a member fixed to and extending outwardly from the timing shaft 16, and the teeth 47 of the gear 14 constitute surface irregularities on the gear which function as magnetically sensible members and which travel in a circular path around the axis of the timing shaft 16. Of course, an additional disc (not shown) axled on the timing shaft 16 and being supplied with surface irregularities could be used for measuring the rotational velocity of the shaft 16. The rotation responsive means 46 also includes a first signal generator means 48 for generating a first signal in response to movement of the gear teeth 47 past a predetermined point in their path of movement. In particular, the first signal generator means 48 includes a magnetic sensor 49 disposed in closely spacrd relation adjacent to the path of the gear teeth 47, the sensor 48 being fixed relative to the engine so that it is at a fixed, or predetermined, point relative to the path of movement of the gear teeth. In the illustrated embodiment, gear 14 has 48 teeth, and thus 48 signals will be generated for each full revolution of the timing shaft 16. Put otherwise, a new signal will be generated for each 7.5° of rotation of the timing shaft 16, or for each 15° of rotation of the engine crank shaft 11.

A second rotation responsive means 51 is provided in conjunction with the fuel camshaft 19 which will also function to generate a signal each time engine 10 has rotated through a particular angle. In this instance, the rotation responsive means 51 includes a ferromagnetic drum 52 fixed to and extending outwardly from the fuel camshaft 19, the drum 52 having a plurality of equi-distantly spaced slots 53 around the periphery 54 thereof. Slots 53 again comprise surface irregularities of the drum and serve as magnetically sensible members which move in a circular path around the axis of the fuel camshaft 19. A second signal generator means 56 functions to generate a signal in response to movement of slots 53 past a predetermined point in their path of movement, the signal generator means 56 including a magnetic sensor 57 mounted, as by bracket 58, in fixed relation to fuel pump 21, so that the magnetic pickup head 59 is closely spaced to the path of movement of the slotted periphery of drum 52. The location of the pickup head 59 constitutes a fixed or predetermined point in the path of circular movement of drum slots 53. In the particular embodiment herein illustrated, drum 52 has 12 slots, and thus twelve signals will be generated for one full revolution of the fuel camshaft. This corresponds to 30° of fuel camshaft rotation, or, 60° of engine rotation.

Figure 2:
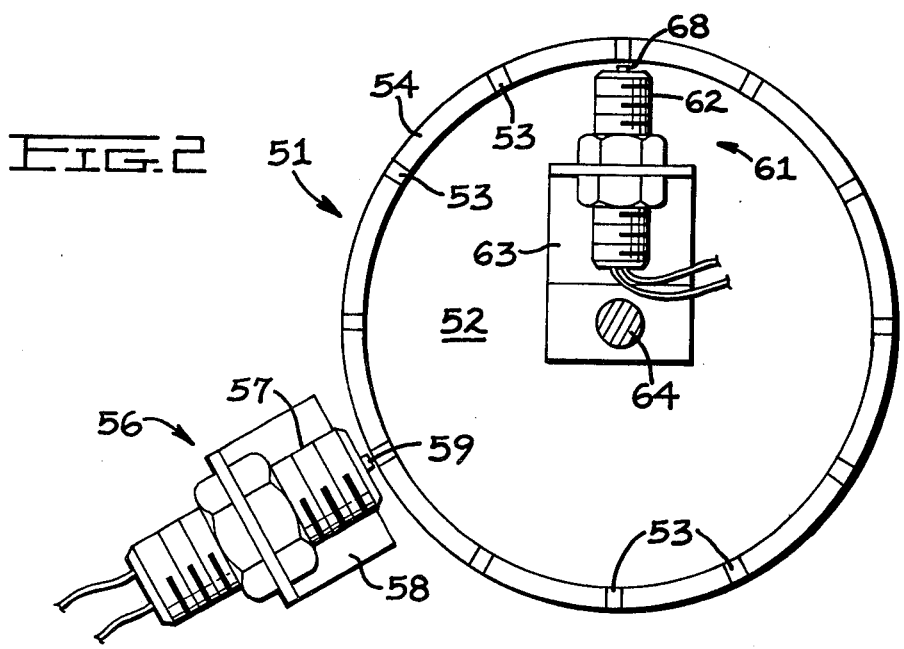
FIG. 2 is an end elevational view, partly in section, of the drum and magnetic sensors used in the sensor arrangement of FIG. 1.

A third signal generator means 61 (FIG. 2) is provided for generating a signal in response to movement of the slotted periphery of drum 52 past a determinable point in the path of movement of drum slots 53, and includes a magnetic sensor 62 mounted on bracket 63 which is fixed to shaft 64, the latter being co-axial to the fuel camshaft 19.

Meshed gears 66 and 67, fixed to shaft 64 and the fuel rack 41, function to move magnetic sensor 62 around the axis of shaft 64 in an amount proportional to rotational movement of the fuel rack 41, so that the magnetic pickup head 68 is moved to a point adjacent the slotted drum which is determined by the position of the fuel rack 41. The location of pickup head 68 constitutes a determinable point along the path of circular movement of drum slots 53.

The signals from the first, or gear sensor 49 and from the second and third drum sensors 57 and 62 are sent to the data processor 70 wherein digital signals are generated which are proportional to the magnitude of timing advance angle, fuel rack angle and fuel camshaft speed. These signals may then be used in an overall engine control system (not shown).

Figure 3:
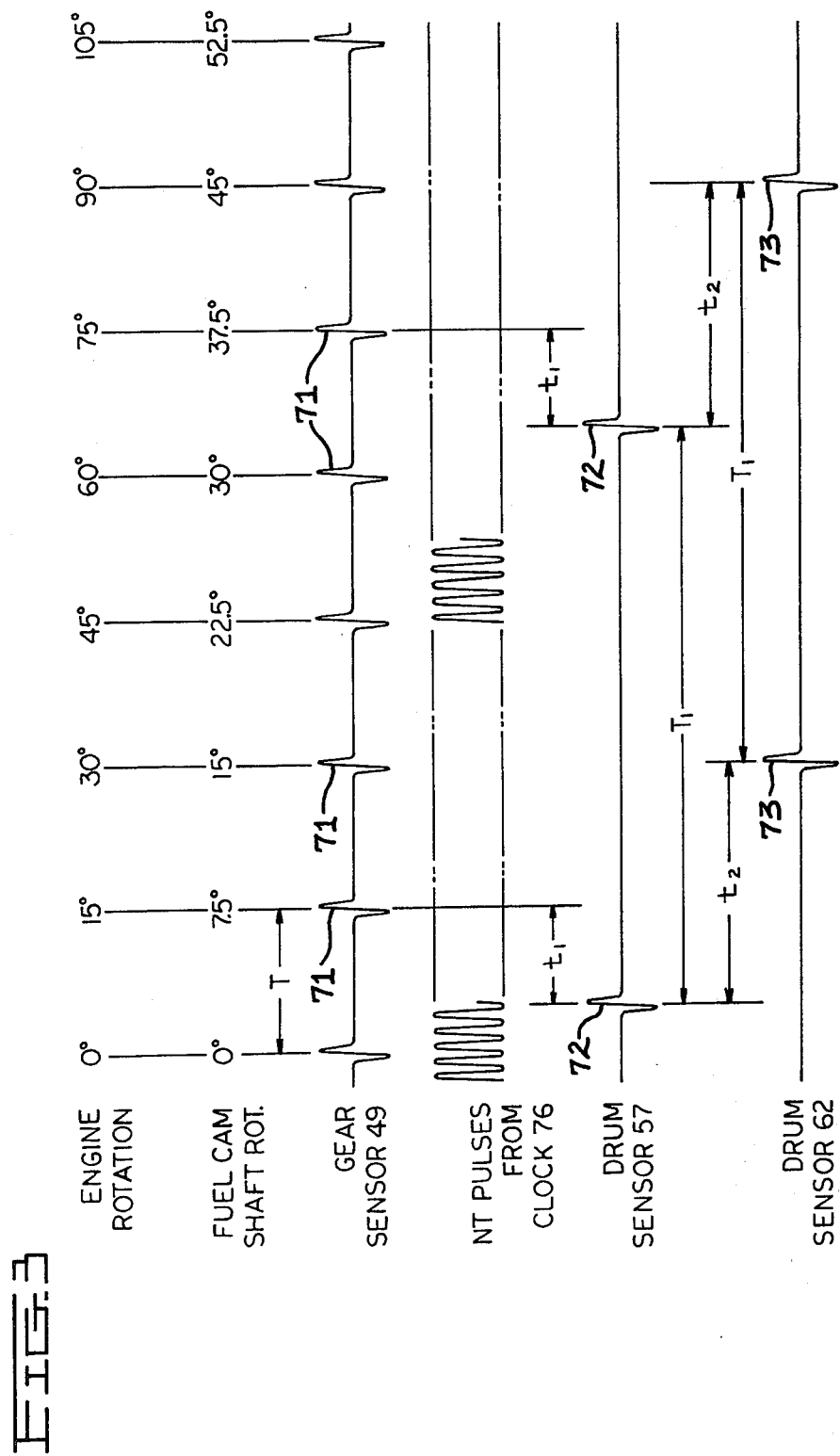
FIG. 3 is a timing chart of the sensor signals produced by the sensor arrangement of FIG. 1.

The time relation of the signals generated by the various sensors is illustrated in FIG. 3. The gear sensor 49 of the first signal generator means 48 will produce a first signal 71 in response to each 15° of engine revolution. The time T between each consecutive first signal 71 will be dependent upon, and inversely proportional to, the engine speed. The drum sensor 57 of the second signal generator 56 will produce a second signal 72 in response to each 60° of rotation of the engine. The time $T_1$ between successive second signals 72 will be inversely proportional to the speed of the fuel camshaft, and thus also inversely proportional to engine speed. The time $t_1$ between a second signal 72 and the next successive first signal 71 is proportional to the magnitude of the timing advance angle, since the more that the timing means 18 advances the fuel camshaft 17 relative to the timing shaft 16, the greater the length of time that it will take for a first signal 71 to be generated after generation of a second signal 72. The time $t_1$ for any given timing advance angle is also inversely proportional to engine speed, but the data processor 70 functions to give a timing advance angle signal which is independent of engine speed.

The drum sensor 62 of the third signal generator means 61 generates third signals 73 at the same frequency as the second signals 72. The time $t_2$ between a second signal 72 and the next successive third signal 73 is a function of the position of the drum sensors 57 and 62 relative to each other. As is apparent, with a fixed sensor 57 and a 12-slot drum, the movable drum sensor can be varied through 30° with a corresponding variance in the time $t_2$. The gear ratio of gears 66 and 67 should accordingly be chosesn so that full movement of the fuel rack 47 between its extreme position will produce less than 30° of movement of drum sensor 62 between its extreme positions.

The data processor 70 as shown in FIG. 4 includes a clock means 76 for generating a series of high frequency pulses at a frequency proportional to engine speed. For example, the first signals 71 can be applied to a frequency determinator 77 and the signal therefrom, proportional to engine speed, can then be multiplied by a high magnitude constant N in the clock means 76 to generate the clock pulses.

Each time that the drum sensor 57 generates a second signal it is applied to the $t_1$ gate 78 to close the gate for passage of clock pulses therethrough. The first signals 71 of the gear sensor 49 are applied to the $t_1$ gate 78 and the first signal 71 occurring after a second signal 72 will open the $t_1$ gate. The clock pulses occurring during the time the $t_1$ gate is closed are passed to and counted by the $t_1$ counter 79. After the count is complete, it is transferred to latch 81 and counter 79 is reset, awaiting the next closing of the $t_1$ gate 78 by the next occurring signal 72 from drum sensor 57. The latched count in latch 81 provides a digital signal proportional to the magnitude of the timing advance angle which may be used in anegnine control system. Since the clock frequency is proportional to the engine speed, and since the time $t_1$ is inversely proportional to the engine speed, the number of clock pulses counted, for any given timing advance angle, will be the same for varying engine speeds. Thus, the $t_1$ count will vary only if the timing advance angle is changed.

Each second signal 72 is aldo applied to the $t_2$ gate 82 to close the gate for passage of clock pulses therethrough, the $t_2$ gate 82 being opened by the next third signal 73 from the drum sensor 62. The clock pulses occurring during the $t_2$ time period are then counted by the $t_2$ counter 83, and transferred to latch 84 after the count is complete, to provide a digital signal proportional to the amount that the drum sensor 62 has been shifted in response to movement of the fuel rack 41.

Again, since the length of time $t_2$ will vary inversely with engine speed, the number of clock pulses occurring during the time the $t_2$ gate is closed is independent of engine speed and will change only if the position of the drum sensor 62 is changed.

Since a new $t_1$ count and a new $t_2$ count is obtained in response to each generation of a second signal 72, new signals as to the timing advance angle and first rack position are generated for each 60° of engine rotation.

The third signals 73 from the drum sensor 62 can also be applied to frequency determinator 86 which generates a signal inversely proportional to the time period between successive signals 73. The generated signal is thus proportional to the fuel camshaft speed and sent to latch 87 for use in a control system as desired.

INDUSTRIAL APPLICABILITY

The described system is particularly useful as part of an overall engine control system wherein quickly updated digital information, obtained many times during a single engine revolution, is required as to the magnitude of timing angle advance, the magnitude of fuel rack movement, and the fuel camshaft speed.

Although the fuel pump 21 is illustrated herein as one having a scrolled-plunger operation with a rotatable fuel rack 41, the invention is also applicable to sleeve-metering fuel pumps having a reciprocating fuel rack shaft. In such case, suitable mechanism, such as a rack and pinion connection, can be used to convert linear motion of the shaft to rotary movement of the drum sensor 62 so that the drum sensor will be moved along the path of movement of the drum slots 53 in an amount proportional to rack movement.

The illustrated system may also be modified by use of a flip-flop, or similar device, so that operative first signals 71 will be generated in response to passage of every other tooth or gear 14 past the gear sensor 49. This will cause the first signal 71 to be generated for each 30° of engine rotation, and will enable the system to measure timing advance angles of up to 30°.

In the particular system shown, the sensible members, i.e. gear teeth 47, are fixed to the timing shaft 16 and rotate therewith at the rotational speed of the timing shaft 16. However, since the timing shaft is gear driven by the engine crank shaft 11, it would be possible to use similar sensible members on the crank shaft. For example, the illustrated gear sensor 49 could be located to sense passage of the gear teeth on crank shaft gear 13. If such gear had 24 gear teeth, and since the gear teeth or gear 13 have a rotational speed proportional to that of timing gear 16, the same number of first signals 71 would be generated for each full engine revolution as in the described embodiment.

I claim:

1. In a system having first and second rotatable shafts (16,19), timing means (18) for rotatably driving one (19) of said shafts by the other (16) and for varying the angular relationship between said shafts (16,19), drive means (17) for rotating said shafts (16,19) at a selectable speed of rotation, the improvement comprising:
   at least one first sensible member (47) rotatable at a speed constantly proportional to the speed of said first shaft (16) and movable through a first circular path;
   a first signal generator means (48) for generating a first signal (71) in response to movement of said first sensible member (47) past a predetermined point (49) in said first circular path;

at least one second sensible member (53) rotatable at a speed constantly proportional to the speed of said second shaft (19) and movable through a second circular path;

a second signal generator means (51) for generating a second signal (72) in response to movement of said second sensible member (53) past a predetermined point (59) in said second circular path;

clock means (76) for generating a series of clock pulses; and counting means (78,79) for counting the number of said clock pulses occurring in the interval beginning with a signal (72) from one (51) of said first and second signal generator means (48,51) and ending with the next succeeding signal (71) from the other (48) of said first and second signal generator means (48,51).

2. In a system according to claim 1, wherein said clock means (76) generates clock pulses at a frequency proportional to the speed of one (16) of said first and second shafts (16,19).

3. In a system according to claim 1, including a first fixed member (14) fixed to and extending outwardly from said first shaft (16) and a second fixed member (52) fixed to and extending outwardly from said second shaft (19), said first sensible member (47) being located on said first fixed member (14) and said second sensible member (53) being located on said second fixed member (52).

4. In a system according to claim 1, including first and second circular members (14,52) each rotatable about the respective canter thereof, a plurality of said first sensible members (47) located on said first circular member (14) and spaced equi-angularly around said first circular member (14), and a plurality of said second sensible members (53) located on said second circular member (52) and spaced equi-angularly around said second circular member (52).

5. In a system according to claim 4, wherein said clock means (76) generates clock pulses at a frequency proportional to the speed of one (16) of said first and second shafts (16,19).

6. In a system according to claim 4, wherein said first circular member (14) is fixed to said first shaft (16) and said second circular member (52) is fixed to said second shaft (19).

7. In a system according to claim 4, wherein said first and second circular members (14,52) are ferromagnetic material, said first and second sensible members (47,53) are irregularities of said circular members (14,52) and said first and second signal generator means (48,51) each include a magnetic sensor (49,57) located adjacent the respective paths of movement of said first and second sensible members (47,53).

8. In a system according to claim 1, wherein said first sensible member (47) is a ferromagnetic surface discontinuity, said first signal generator means (48) includes a magnetic sensor (49) located adjacent the path of movement of said first sensible member (47), said second sensible member (53) is a ferromagnetic surface discontinuity and said second signal generator means (51) includes a magnetic sensor (57) located adjacent the path of movement of said second sensible member (53).

9. In a system according to claim 1, wherein said counting means (78,79) includes a pulse counter (79) and a gate (78) connected between said clock means (76) and said pulse counter (79), said gate (78) being closed in response to receiving a signal (72) from one (51) of said first and second signal generator means (48,51) and being opened in response to receiving a signal (71) from the other (48) of said first and second signal generator means (48,51).

10. In a system according to claim 9, wherein said clock means (76) generates clock pulses at a frequency proportional to the speed of one (16) of said first and second shafts (16,19).

11. In a system according to claim 1, wherein said drive means (17) includes an engine (10), an engine driven crank shaft (11), a first gear (14) fixed to said first shaft (16), a second gear (13) fixed to said crank shaft (11) and meshed with said first gear (14), and said system includes a fuel pump (21) for delivering fuel to said engine, and said second shaft (19) is the camshaft (19) of said fuel pump (21).

12. In a system according to claim 11, wherein said first sensible member (47) is fixed to one (16) of said crank and first shafts (11,16) and said second sensible member (53) is fixed to said second shaft (19).

13. In a system according to claim 11, wherein said first sensible member (47) is a ferromagnetic discontinuity fixed to one (14) of said crank and first shafts (11,16), said first signal generator means (48) includes a magnetic sensor (49) located adjacent the path of movement of said first sensible member (47), said second sensible member (53) is a ferromagnetic surface discontinuity fixed to said second shaft (19) and said second signal generator means (51) includes a magnetic sensor (57) located adjacent the path of movement of said second sensible member (53).

14. In a system according to claim 13, wherein said first sensible member (47) is located on said first gear (14).

15. In a system according to claim 11, wherein said fuel pump (21) includes a movable fuel control means (41), and said system including a third signal generator means (61) for generating a third signal (73) in response to movement of said second sensible member (53) past a determinable point (68) in said second circular path, means (64,66,67) for moving said determinable point (68) along said second circular path in proportional response to movement of said fuel control means (41), and means (82,83) for counting the number of clock pulses occurring in the interval beginning with a signal (72) from one (51) of said second and third signal generators (51,61) and ending with the next successive signal (73) of the other (61) of said second and third signal generator means (51,61).

16. The system of claim 1 including a third shaft (41) movable through a limited range of movement;

a third signal generator means (61) for generating a third signal (73) in response to movement of said second sensible member (53) past a determinable point (68) in said second circular path;

means (64,66,67) for shifting said determinable point (68) along said second circular path in response to, and through a distance proportional to, movement of said third shaft (41); and means (82,83) for counting the number of said clock pulses occurring in the interval beginning with a signal (72) from said second signal generator means (51) and ending with the next succeeding signal (73) from the other third signal generator means (61).

17. In a system, according to claim 16, wherein said clock means (76) generates clock pulses at a frequency proportional to the speed of said first shaft (16).

18. Position measuring apparatus, comprising:

a first shaft (41) movable through a limited amount of movement;

a second rotating shaft (19);

at least one sensible member (53) mounted on said second shaft (19) and being movable through an orbital path;

a first signal generator means (51) for generating a first signal (72) in response to said sensible member (53) moving past a fixed point (59) in the orbital path;

a second signal generator means (61) for generating a second signal (73) in rsponse to said sensible member (53) moving past a determinable point (68) in the orbital path;

means for shifting said determinable point (68) along said path in response to, and through a distance proportional to, movement of said first shaft (41);

clock means (76) for generating a series of clock pulses; and counting means (82,83) for counting the number of said clock pulses occurring in the interval beginning with a signal (72) from said first signal generator means (51) and ending with a signal (73) from the said second signal generator means (61).

19. Apparatus, as set forth in claim 18, wherein said first shaft (41) is rotatably movable.

20. In a system according to claim 19, wherein said counting means (82,83) includes a gate (82) having an input connected to said clock means (76) and a pulse counter (83) having an input connected to the output of said gate (82), said gate (82) being opened in response to receiving a signal (71) from said first signal generator means (51) and being closed in response to receiving a signal (73) from said second signal generator means (61).

21. Apparatus as set forth in claim 18, including a ferromagnetic member (52) fixed to said second shaft (19), and wherein said sensible member (53) is a surface discontinuity on said ferromagnetic member (52), and said first and second signal generators (51,61) each include a magnetic sensor (57,62) located adjacent the path of movement of said surface discontinuity (53).

* * * * *